United States Patent
Bienkowski et al.

(10) Patent No.: US 9,927,232 B2
(45) Date of Patent: Mar. 27, 2018

(54) ENSURING INSPECTION COVERAGE FOR MANUAL INSPECTION

(71) Applicant: SIEMENS AKTIENGESELLSCHAFT, München (DE)

(72) Inventors: Lukasz Adam Bienkowski, Munich (DE); Christian Homma, Kirchheim b. Munich (DE); Hubert Mooshofer, Munich (DE); Max Rothenfusser, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 722 days.

(21) Appl. No.: 14/378,839

(22) PCT Filed: Jan. 24, 2013

(86) PCT No.: PCT/EP2013/051289
§ 371 (c)(1),
(2) Date: Aug. 14, 2014

(87) PCT Pub. No.: WO2013/120676
PCT Pub. Date: Aug. 22, 2013

(65) Prior Publication Data
US 2016/0018217 A1    Jan. 21, 2016

(30) Foreign Application Priority Data

Feb. 15, 2012 (DE) .................. 10 2012 202 279

(51) Int. Cl.
*G01B 21/04* (2006.01)

(52) U.S. Cl.
CPC .......... *G01B 21/04* (2013.01); *G01B 21/047* (2013.01)

(58) Field of Classification Search
None
See application file for complete search history.

(56) References Cited

U.S. PATENT DOCUMENTS 6,327,921 B1 * 12/2001 Hsu .................. G01M 5/0016
                                                     73/866.5
2002/0062077 A1    5/2002 Emmenegger et al.
(Continued)

FOREIGN PATENT DOCUMENTS

DE    10 2006 058 705 A1    6/2008
DE    10 2012 202 279.1        2/2012
(Continued)

OTHER PUBLICATIONS

Javier García-Martín, Non-Destructive Techniques Based on Eddy Current Testing, Sensors 2011, 11, 2525-2565; doi:10.3390/s110302525, 1424-8220, Jan. 5, 2011.*
(Continued)

*Primary Examiner* — Tung Lau
(74) *Attorney, Agent, or Firm* — Slayden Grubert Beard PLLC

(57) ABSTRACT

In order to support an inspecting person in a method for the manual non-destructive inspection of a test object, a detection device is provided for detecting three-dimensional surface coordinates of a region to be inspected on the test object and for continuously determining positions and speeds of an inspecting tool relative to the test object Discrete position values and speed values of the inspecting tool for the respective measurement time points are stored by a storage device. A computing device determines the share of an already inspected region in relation to the total region of the test object to be inspected. The method and device can be used for manual inspection of test objects having a plurality of different shapes. The inspecting person is effectively relieved and the process for the non-destructive inspection is documented in order to guarantee a complete inspection.

13 Claims, 1 Drawing Sheet

(56) References Cited

U.S. PATENT DOCUMENTS

| | | |
|---|---|---|
| 2004/0059217 A1 | 3/2004 | Kessman et al. |
| 2005/0088529 A1 | 4/2005 | Geng |
| 2007/0081709 A1 | 4/2007 | Warmath et al. |
| 2007/0100579 A1 | 5/2007 | Rempt et al. |
| 2009/0253980 A1* | 10/2009 | Wollenweber ......... A61B 6/032 600/411 |
| 2011/0123097 A1 | 5/2011 | Van Coppenolle |
| 2011/0278277 A1* | 11/2011 | Stork Genannt Wersborg .......... B23K 26/02 219/209 |

FOREIGN PATENT DOCUMENTS

| | | |
|---|---|---|
| FR | 2 921 492 A1 | 3/2009 |
| WO | 2011/063266 A2 | 5/2011 |
| WO | 2011/138741 A1 | 11/2011 |
| WO | PCT/EP2013/051289 | 1/2013 |

OTHER PUBLICATIONS

Ingolf Hertlin, Acoustic Resonance Testing: the upcoming volume-oriented NDT method, 2 a 06 de Junho de 2003 / Jun. 2 to 6, 2003, 7 pages.*

Examination Report dated Mar. 30, 2012 for corresponding German Patent Application No. 10 2012 202 279.1.

International Search Report dated Jun. 11, 2013 for corresponding International Patent Application No. PCT/EP2013/051289.

* cited by examiner

1

ENSURING INSPECTION COVERAGE FOR MANUAL INSPECTION

CROSS REFERENCE TO RELATED APPLICATIONS

This application is based on and hereby claims priority to International Application No. PCT/EP2013/051289 filed on Jan. 24, 2013 and German Application No. 10 2012 202 279.1 filed on Feb. 15, 2012, the contents of which are hereby incorporated by reference.

BACKGROUND

The invention relates to a method for the manual nondestructive inspection of a test object, and to a device for supporting a manual nondestructive inspection of a test object.

In a nondestructive test of a test object, a manual test is conducted in many instances, particularly when automation is not worthwhile given a diverse range of various test objects. Irrespective of the type of test technique applied, the so-called test coverage is decisive for a reliable test statement.

Test coverage is provided when a region of a test object to be completely tested has actually been completely tested.

By way of example, in a manual ultrasonic test a component surface is scanned by a test person with the aid of a test head. In order for a test area to be covered completely, the test head tracks must extend without gaps over the complete area. Distances between the test head tracks and test head speeds are not permitted to become too large. Similar considerations apply in the case of a manual eddy-current test.

By way of example, in active thermography a test person positions an inductor at specific sites and at a specific spacing from the test object. All prescribed measurements must be carried out to obtain complete test coverage, it being necessary to maintain the position of the inductor and the spacing from the component.

It is the task of the test person to ensure the required test coverage and to sign off for it. There is the disadvantage that it is no longer possible in a customary way to monitor whether all of the required regions of the test objects have been tested, that is to say covered, as prescribed.

It is the task of the test person to ensure the test coverage in a manual test. It is no longer possible customarily to monitor the tested area or the correct position retrospectively.

What is customary is to make use of guide devices in part as a way to support the test person. However, there is the disadvantage here that guide devices are very specific to the test object, as a result of which there is a large outlay on the provision of such guide devices given a diverse range of various test objects. Furthermore, a required correct placement of a guide device on a test object can constitute a source of error. Such a correct replacement of guide devices likewise effects an increased outlay in carrying out the test.

Alternatively, carrying out a test using position encoders is supported at least in part customarily. It is possible in this way to monitor instances of a maximum test speed. There is the disadvantage that errors can result with regards to reference positions and/or movement directions of test heads, which means, in the end, that the test person is once again responsible for ensuring a required test coverage.

SUMMARY

It is one possible object to provide a method and a device for the manual nondestructive inspection of a test object in such a way that all of the regions of a test object to be tested are inspected completely, reliably and reproducibly.

In accordance with a first aspect, the inventors propose a method for the manual nondestructive inspection of a test object involving the following is provided: using a detecting device to detect three-dimensional surface coordinates of a region of the test object which is to be tested; using the detecting device to continuously determine positions and speeds of a test tool relative to the test object; using a storage device to store discrete position values and speed values of the test tool at respective measurement instants; and using a computer device to determine how far a region defined by a sum of all the positions of the test tool assumed at previous measurement instants covers a region of the test object to be tested completely.

Coverage can be understood to mean that, for example, an area moved over by the test tool is congruent with an area of a test object to be tested.

In accordance with a second aspect, the inventors propose a device for supporting a manual nondestructive inspection of a test object which has the following devices: a detecting device for detecting three-dimensional surface coordinates of a region of the test object to be tested, and for continuously determining positions and speeds of a test tool relative to the test object; a storage device for storing discrete position values and speed values of the test tool at respective measurement instants; a computer device for determining how far a region defined by a sum of all the positions of the test tool assumed at previous measurement instants covers a region of the test object to be tested completely.

It is possible in accordance with the proposals, to ensure a manual nondestructive test is complete. It is likewise possible to document a test coverage and enable its implementation. A test person can effectively be relieved when a test is carried out. Methods and devices can be used in a versatile way for various test methods.

In accordance with an advantageous refinement, the detecting device can detect the three-dimensional surface coordinates of the test object by a depth sensor camera. In this case, a depth sensor camera can execute a method by strip light projection, three-dimensional color triangulation, or by laser cutting. By way of example, depth sensor cameras are available under the trade name of "Microsoft Kinect".

In accordance with a further advantageous refinement, the computer device can determine information relevant to the manual inspection and project the same onto a surface of the test object by a projection unit. For example, a representation of the test coverage can be executed by a projector or beamer on the test object surface. For example, an already detected area and/or an area still to be detected can be output. Likewise, it is possible to display a next test position and/or a pattern of test positions, specifically in the case of a punctiform test from individual measurement sites. Furthermore, it is possible to project an indication as to whether a speed at which a test head is being drawn over the test object is correct or too fast or too slow.

In accordance with a further advantageous refinement, the information can comprise an already detected surface and/or an area still to be detected, next test positions or data relating to speed values of the test tool.

In accordance with a further advantageous refinement, the detecting device can identify the test tool by detecting the shape thereof. That is to say, it is possible in addition to identify a test tool automatically.

In accordance with a further advantageous refinement, a library of possible shapes of the test tool can be used to identify the test tool.

A library of possible shapes of test tools can be used.

In accordance with a further advantageous refinement, the detecting device can identify the type of test tool with the aid of a code arranged thereon.

In accordance with a further advantageous refinement, the detecting device can identify the type of test tool while simultaneously orienting the detecting device in the effective direction relative to the test object. For example, the shape of a test tool can be determined with a depth sensor camera by reading in the shape in such a way. It is likewise possible to use the detecting device to identify the type of test tool with the aid of a code applied to the tool as soon as the detecting device is directed onto the test tool applied to the test object.

In accordance with a further advantageous refinement, the detecting device can continuously determine positions and associated alignments of the test tool relative to the test object by a mark arranged on the test tool. Thus, a 3D camera can be used to identify the position and alignment of the test tool with the aid of a mark applied to the test tool.

In accordance with a further advantageous refinement, the storage device can additionally store discrete position values and associated alignment values of the test tool at the respective measurement instants. That is to say in addition to the position information it is possible to store data relating to the orientation of the test tool at the measurement instants.

In accordance with a further advantageous refinement, the computer device can compare the data acquired by the detecting device with the data, determined by the test tool, relating to the respective measurement positions, and thereby monitor the inspection for plausibility. For example, it is possible to monitor a grinding condition during an ultrasonic test. In addition to the inspection, a depth sensor camera can detect that a curvature of a surface to be tested lies within a tolerance range.

In accordance with a further advantageous refinement, it can be ascertained how the test person moves the test tool relative to the test object. For example, it can be prescribed that one or more conditions placed on the test coverage be fulfilled by the test person.

In accordance with a further advantageous refinement, it can be ascertained that the test tool is moved relative to the test object along test tracks which are likewise intended to have a specified prescribed spacing from one another.

In accordance with a further advantageous refinement, the computer device can define regions of the test object to be tested by a CAD model.

In accordance with a further advantageous refinement, the test tool can be an ultrasonic test head, an eddy-current test head or an inductor.

In accordance with a further advantageous refinement, a test person can directly move the test tool continuously along the surface of the test object or discretely into measurement positions.

In accordance with a further advantageous refinement, a trigger device can be used to fix a respective measurement instant by trigger signals.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
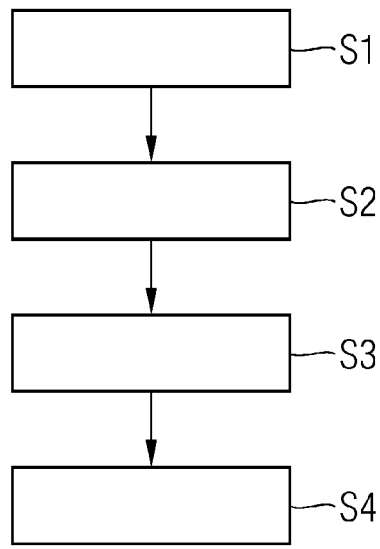
FIG. 1 shows an exemplary embodiment of the proposed method.

Reference will now be made in detail to the preferred embodiments of the present invention, examples of which are illustrated in the accompanying drawings, wherein like reference numerals refer to like elements throughout.

FIG. 1 shows an exemplary embodiment of the proposed method. In S1, a detecting device detects three-dimensional surface coordinates of a region of a test object which is to be tested. In S2, the detecting device continuously determines positions and speeds of a test tool relative to the test object. In accordance with S3, a storage device stores discrete position values and associated speed values of the test tool at respective measurement instants. In S4, the computer device determines how far an already detected scanning area covers a total area to be scanned.

Figure 2:
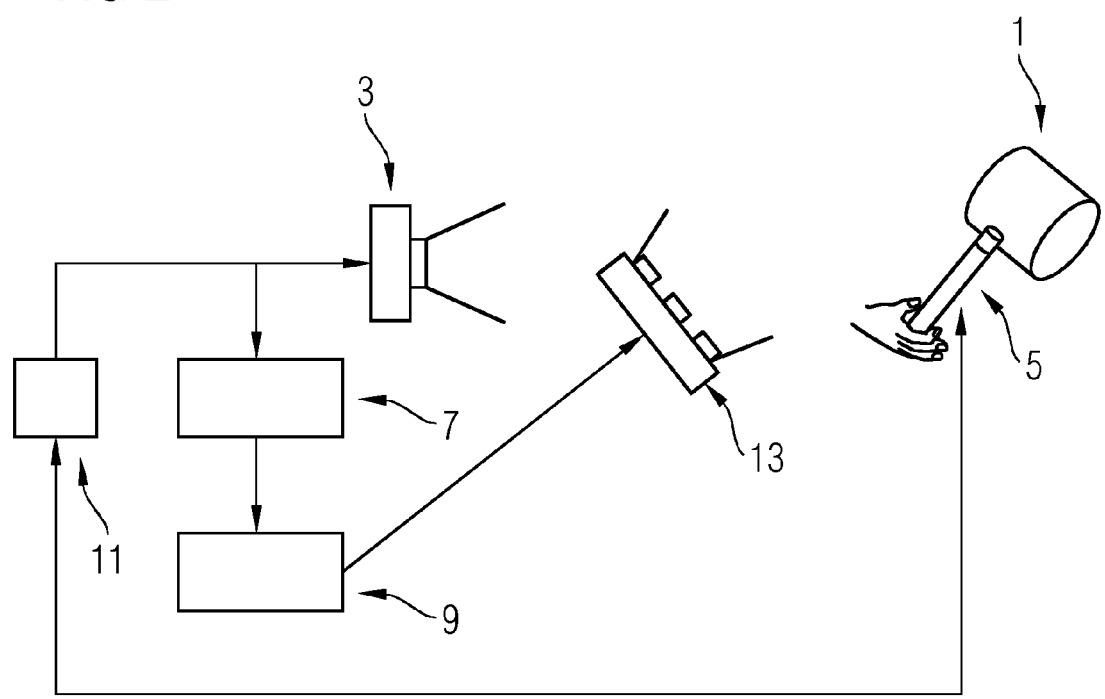
FIG. 2 shows an exemplary embodiment of a proposed device.

FIG. 2 shows an exemplary embodiment of the proposed device. The device supports a manual nondestructive inspection of a test object 1. A manual inspection is executed by a test person. The latter is supported by a detecting device 3 for detecting three-dimensional surface coordinates of a region of the test object 1 which is to be tested, and for continuously determining positions and speeds of a test tool 5 relative to the test object 1. The detecting device 3 can be a depth sensor camera, which detects three-dimensional surface coordinates of the test object 1, for example by strip light projection. Other methods are likewise possible. A storage device 7 stores discrete position values and speed values of the test tool 5 at respective measurement instants. By way of example, the test tool 5 is guided at a specific spacing along the surface of the test object 1 by the hand of the test person. By way of example, the measurement instants can be defined by a trigger device 11. The trigger device 11 produces trigger signals for this purpose. A storage device 7 stores all of the discrete position values and speed values of the test tool at respective measurement instants. The test tool 5, which can, for example, be an ultrasonic test head, is activated to inspect a test site at the respective measurement instants. A computer device 9 determines a degree as to how far a region determined by a sum of all the positions, assumed at previous measurement instants, of the test tool 5 covers a region of the test object 1 to be tested completely. That is to say, the computer device 9 determines how large a portion of an already detected scanning area is in relation to a total scanning area. If the test object 1 has been completely tested or inspected, a test coverage has been provided and the test coverage has a value of 100%. Information calculated by the computer device 9 can be projected onto the surface of the test object by a projection unit 13 given knowledge of the three-dimensional surface coordinates of the test object 1 onto the surface of the test object 1. This effectively facilitates the inspection for the test person.

It is particularly advantageous to use as detecting device 3 a depth sensor camera which detects the region of the test object 1 to be tested. By way of example, the test tool 5 can be determined in the depth data of the 3D camera, that is to say of the detecting device 3, with the aid of the shape of the test tool 5. The test tool 5 can be, for example, an ultrasonic test head, an eddy-current probe, an inductor or a hot-air/cold-air blower. The detecting device 3 enables a continuing determination of the 3D position and speed of the test tool 5. Likewise, the storage device 7 enables storage of the position and speed of the test tool 5 at the respective measurement instants. Such measurement instants are, for example, pulse transmission instants in the case of ultrasound, or excitation instants in the case of active thermography. The device enables a determination of test coverage with the aid of the stored position of the test tool 5 at the respective measurement instants. The projection unit 13 can be used to image an area which has been already detected, and/or an area which is still waiting to be scanned or to be inspected.

The device is based on a test system for carrying out a manual test, in particular by ultrasound, eddy current or active thermography. In this case, use is made of a test tool 5 which is moved over the test object 1 by a test person, and/or is positioned at various sites. A test head position can be detected using position tracking by a depth sensor camera as detecting device 3. As an option, a beamer can be used as projection unit 13 to project the test coverage. A beamer can, in particular, be a digital projector. It is possible to make use as a depth sensor camera of conventional techniques, for example 3D color triangulation, or products such as, for example, "Microsoft Kinect". Ultrasonic test heads, eddy-current test heads and inductors are examples of typical test tools 5. Measurement instants are preferably communicated by a trigger signal by an ultrasonic test unit or by a unit for exciting the thermographic test.

In order to support a test person in a method for the manual nondestructive inspection of a test object 1, provision is made of a detecting device 3 for detecting three-dimensional surface coordinates of a region of the test object 1 to be tested and for continuously determining positions and speeds of a test tool 5 relative to the test object 1, a storage device 7 being used to store discrete position values and speed values of the test tool 5 at respective measurement instants. A computer device 9 determines the proportion of an already inspected region in relation to the total region of the test object 1 to be tested. The idea is suitable, in particular, for a manual inspection of test objects 1 having a multiplicity of various shapings. The test person is effectively relieved, and the operation of the manual nondestructive inspection is documented in order to ensure a complete test.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A device for manual nondestructive inspection of a test object with a test tool, the device comprising:
    a depth sensor camera configured to detect three-dimensional surface coordinates of a region of the test object to be inspected, and to continuously determine positions and speeds of the test tool relative to the test object;
    a trigger device counting intervals and generating trigger signals at an end of each interval;
    a memory configured to store discrete position values and speed values of the test tool at respective measurement instants based on the trigger signals received from the trigger device;
    a processor determining a sum of the position values of the test tool at the measurement instants and how much of the test object has been inspected by the test tool; and
    an output device generating an indication corresponding to how much of the region has been inspected.

2. The device as claimed in claim 1, wherein
    the depth sensor camera comprises a device selected from the group consisting of a strip light projection device, a three-dimensional color triangulation device, and a laser cutting device.

3. The device as claimed in claim 1, wherein the output device comprises a projection unit projecting the indication onto a surface of the test object to guide manual operation of the test tool.

4. The device as claimed in claim 1, wherein the depth sensor camera identifies the test tool by detecting a shape of the test tool.

5. The device as claimed in claim 1, wherein the depth sensor camera identifies the test tool by detecting a code arranged on the test tool.

6. The device as claimed in claim 1, wherein the depth sensor camera identifies the test tool while simultaneously orienting the depth sensor camera in an effective direction relative to the region of the test object being inspected.

7. The device as claimed in claim 1, wherein the depth sensor camera monitors positions and associated alignments of the test tool relative to the test object using a mark arranged on the test tool.

8. The device as claimed in claim 1, wherein the processor compares data acquired by the detecting device with data determined by the test tool.

9. The device as claimed in claim 1, wherein the processor defines a plurality of regions of the test object to be inspected using a computer-aided design model.

10. The device as claimed in claim 1, wherein the test tool comprises an ultrasonic test head, an eddy-current test head or an inductor.

11. The device as claimed in claim 3, wherein the indication comprises at least one of information on an already inspected surface area, information on an area still to be inspected, information on next test positions and information relating to speed values of the test tool.

12. The device as claimed in claim 4, wherein the processor accesses a library of possible shapes of the test tool to identify the test tool.

13. The device as claimed in claim 7, wherein the memory stores the discrete position values together with associated alignment values of the test tool at respective measurement instants.

* * * * *